(12) United States Patent
Eylem et al.

(10) Patent No.: US 7,049,030 B2
(45) Date of Patent: May 23, 2006

(54) BATTERY

(75) Inventors: Cahit Eylem, Bellingham, MA (US); Ou Mao, Walpole, MA (US); Stuart M. Davis, Norfolk, MA (US)

(73) Assignee: The Gillette Company, Boston, MA (US)

( * ) Notice: Subject to any disclaimer, the term of this patent is extended or adjusted under 35 U.S.C. 154(b) by 242 days.

(21) Appl. No.: 10/382,941

(22) Filed: Mar. 6, 2003

(65) Prior Publication Data

US 2004/0175613 A1    Sep. 9, 2004

(51) Int. Cl.
    *H01M 4/36*    (2006.01)
(52) U.S. Cl. ............ 429/220; 429/229; 429/232; 429/218.1; 429/231.6; 429/221; 429/224; 429/231.5; 429/206
(58) Field of Classification Search ........ 429/220, 429/232, 218.1, 221, 231.6, 224, 231.5, 206, 429/229
    See application file for complete search history.

(56) References Cited

U.S. PATENT DOCUMENTS

| | | | |
|---|---|---|---|
| 143,644 A | 10/1873 | Smith | |
| 274,110 A | 3/1883 | Lalande et al. | |
| 542,049 A | 7/1895 | Gordon | |
| 1,017,064 A | 2/1912 | Smith et al. | |
| 1,207,382 A | 12/1916 | Edison | |
| 1,255,283 A | 2/1918 | Benner et al. | |
| 1,282,057 A | 10/1918 | Erwin | |
| 1,295,459 A | 2/1919 | Erwin | |
| 1,316,761 A | 9/1919 | Benner et al. | |
| 1,386,095 A | 8/1921 | Edison | |
| 1,415,860 A | 5/1922 | Benner et al. | |
| 1,532,252 A | 4/1925 | Martus et al. | |
| 1,564,741 A | 12/1925 | Wolfe | |
| 1,624,460 A | 4/1927 | Armstrong | |
| 2,157,072 A | 5/1939 | Eddy | |
| 2,189,463 A | 2/1940 | Eddy | |
| 2,829,189 A | 4/1958 | Coleman et al. | |
| 2,994,625 A | 8/1961 | Mendelsohn et al. | |
| 3,713,897 A * | 1/1973 | Liang .................... | 429/207 |
| 4,310,609 A * | 1/1982 | Liang et al. ............ | 429/220 |
| 5,034,291 A | 7/1991 | Jacus | |
| 2003/0148181 A1 * | 8/2003 | Wang et al. ............ | 429/220 |

FOREIGN PATENT DOCUMENTS

| | | |
|---|---|---|
| DE | 22702 | 6/1882 |
| FR | 143644 | 6/1981 |
| GB | 20960 | 3/2003 |
| GB | 397475 | 8/2003 |
| JP | 63-307668 | * 12/1988 |
| JP | 33076687 | 12/1988 |
| WO | WO 2004/102699 A2 | 11/2004 |

OTHER PUBLICATIONS

Deltombe et al., "Aluminum ($^I$)", Atlas of Electrochemical Equilibria Solutions, pp. 168-176, 1974.

Falk, S. et al., *Alkaline Storage Batteries*, John Wiley & Sons, Inc., New York, NY, 1969, p. 41.

McDowell, L. et al., "The Solubility of Cupric Oxide in Alkali and the Second Dissociation Constant of Cupric Acid. The Analysis of Very Small Amounts of Copper", *J. Amer. Chem. Soc.*, vol. LVIII, Jul.-Dec. 1936, pp. 2009-2014.

Hayward, A.; Hearn, B.; Hunt, M.R.; "Solubility of Cupric Oxide in Pure Water at Temperatures up to 500 C" *Nature*, Aug. 12, 1967, vol. 215, No. 5102, p. 730.

Heise and Cahoon, "The Primary Battery", John Wiley & Sons, Inc., 1971, Chap. 4. "The Alkaline Copper Oxide Zinc Cell" (Erwin A. Schumacher) pp. 191-205.

Sue, K.; Hakuta, Y.; Smith, R.; Adschiri, T.; Arai, K. "Solubility of Lead (II) Oxide and Copper (II) Oxide in Subcritical and Supercritical Water" *J. Chem. Eng. Data*, Nov./Dec. 1999, vol. 44, No. 6, pp. 1422-1426.

Sue et al., "Solubility of Lead (II) Oxide and Copper (II) Oxide in Subcritical and Supercritical Water", Journal of Chemical and Engineering Data, vol. 44, No. 6, 1999.

(Continued)

*Primary Examiner*—Laura Weiner
(74) *Attorney, Agent, or Firm*—Fish & Richardson P.C.

(57) ABSTRACT

Batteries and methods of making batteries are disclosed. In some embodiments, a battery includes a housing, a positive electrode comprising a copper material in the housing, a negative electrode in the housing, a separator between the positive electrode and the negative electrode, and an electrolytic solution comprising soluble aluminum in the housing. A method of making a battery can include providing a positive electrode comprising a copper material into a housing, adding a material comprising aluminum to an electrolytic solution, and adding the electrolytic solution into the housing.

16 Claims, 1 Drawing Sheet

OTHER PUBLICATIONS

Marcel Pourbaix, "Atlas of Electrochemical Equilibria In Aqueous Solutions-Table of Contents", National Association of Corrosion Engineers, 1974.

Erwin A. Schumacher, "The Alkaline Copper Oxide:Zinc Cell", The Primary Battery, The Electrochemical Society, Inc., pp. 191-206, 1971.

Falk et al., "Historical Introduction", Alkaline Storage Batteries, The Electrochemical Society, Inc., pp. 1-40, 1969.

McDowell et al., "The Solubility of Cupric Oxide in Alkali and the Second Disassociation Constant of Cupric Acid. The Analysis of Very Small Amounts of Copper", The Journal of the American Chemical Society, pp. 2009-2014, vol. 58, Oct. 1936.

* cited by examiner

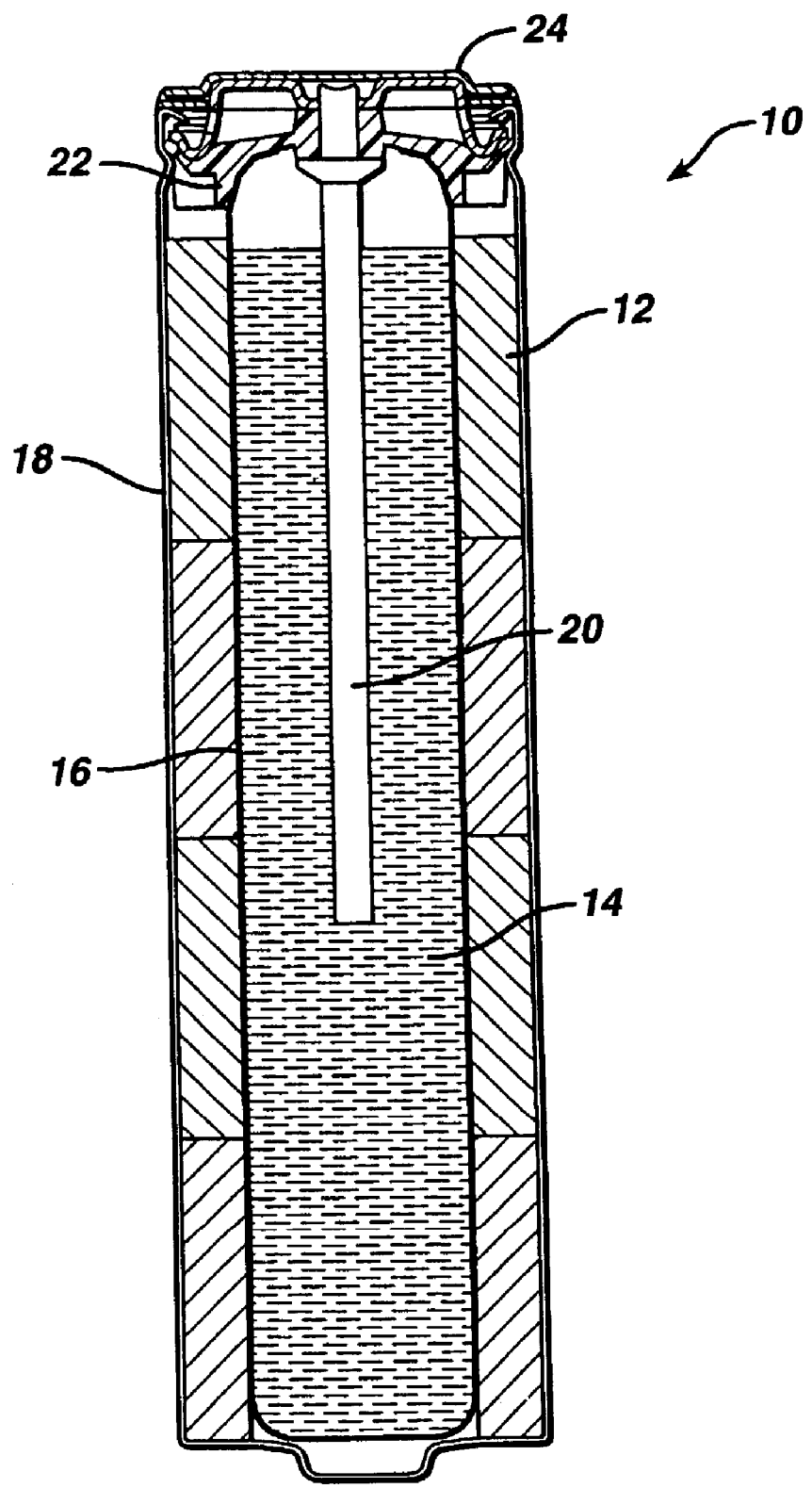
*Figure*

BATTERY

FIELD OF THE INVENTION

The invention relates to batteries.

BACKGROUND

Batteries, such as alkaline batteries, are commonly used as electrical energy sources. Generally, a battery contains a negative electrode and a positive electrode. The negative electrode contains an active material (e.g., zinc particles) that can be oxidized; and the positive electrode contains an active material (e.g., manganese dioxide) that can be reduced. The active material of the negative electrode is capable of reducing the active material of the positive electrode. In order to prevent direct reaction of the active material of the negative electrode and the active material of the positive electrode, the electrodes are electrically isolated from each other by a separator.

When a battery is used as an electrical energy source in a device, such as a cellular telephone, electrical contact is made to the electrodes, allowing electrons to flow through the device and permitting the respective oxidation and reduction reactions to occur to provide electrical power. An electrolyte in contact with the electrodes contains ions that flow through the separator between the electrodes to maintain charge balance throughout the battery during discharge.

SUMMARY

In one aspect, the invention features an alkaline battery including a positive electrode having a copper material (such as, for example, copper oxide), and an alkaline electrolyte having a dissolved aluminum material (such as, for example, $Al_2O_3$, $Al(OH)_3$, aluminum metal, or an alkali metal aluminum oxide). In some cases, the copper material can dissolve in the alkaline electrolyte, which can lower the capacity and/or shelf life of the battery. The presence of aluminum ions can reduce, e.g., suppress, the solubility of the copper material in the alkaline electrolyte, thereby enhancing the storage life and/or capacity of the battery.

In another aspect, the invention features a battery including a housing, a positive electrode in the housing, the positive electrode including a copper material, a negative electrode in the housing, a separator between the positive electrode and the negative electrode, and an electrolytic solution in the housing, the electrolytic solution including dissolved aluminum material.

Embodiments may include one or more of the following features. The copper material includes copper oxide. The copper material includes cupric oxide. The positive electrode includes greater than about 86 weight percent of copper oxide. The positive electrode further includes a binder and a conductive aid. The negative electrode includes zinc. The electrolytic solution is alkaline. The electrolytic solution includes a material selected from the group consisting of potassium hydroxide and sodium hydroxide. The electrolytic solution is saturated with aluminum material. The electrolytic solution includes greater than about one percent by weight of aluminum.

In another aspect, the invention features a primary alkaline battery including a housing, a positive electrode in the housing, the positive electrode including greater than about 86 weight percent of copper oxide, a negative electrode in the housing, the negative electrode including zinc, a separator between the positive electrode and the negative electrode, and an alkaline electrolytic solution in the housing, the electrolytic solution including a hydroxide material and dissolved aluminum. The electrolytic solution can include between about one and about eight weight percent of aluminum.

In another aspect, the invention features a battery including a housing, a positive electrode in the housing, the positive electrode including a copper material, a negative electrode in the housing, a separator between the positive electrode and the negative electrode, and an electrolytic solution in the housing, the electrolytic solution including a first material capable of reducing the amount of the copper material dissolved in the electrolytic solution relative to the amount of the copper material dissolved in a substantially identical electrolytic solution substantially free of the first material.

The copper material can include copper oxide. The first material can include soluble aluminum.

The invention also features methods of making a battery.

In another aspect, the invention features a method of making a battery including providing a positive electrode including a copper material into a housing, dissolving a material including aluminum to an electrolytic solution, and adding the electrolytic solution into the housing.

Embodiments may include one or more of the following features. The positive electrode includes copper oxide. The method includes saturating the electrolytic solution with the soluble material including aluminum. The soluble material including aluminum is selected from the group consisting of aluminum metal, aluminum oxide, aluminum hydroxide, and an alkali metal aluminum oxide. The method further includes adding a negative electrode comprising zinc into the housing.

In another aspect, the invention features a method of making a battery including providing a positive electrode including a copper material, providing a first electrolytic solution, adding a first material to the first electrolytic solution, the first material being capable of reducing the amount of copper material dissolved in the first electrolytic solution relative to an amount of copper material dissolved in a substantially identical electrolytic solution substantially free of the first material, and incorporating the positive electrode and the electrolytic solution into the battery. The first material can include soluble aluminum.

In another aspect, the invention features a method including providing an electrode comprising an active material, and reducing the solubility of the active material in an electrolytic solution. The electrode can be a positive electrode, and the active material can include copper. Reducing the solubility can include dissolving aluminum material into the electrolytic solution. Alternatively or in addition, the aluminum can be dissolved during discharge of the battery.

In another aspect, the invention features a method of operating a battery including providing the battery including a positive electrode including a copper material, an electrolytic solution, and a negative electrode, and dissolving the negative electrode into the electrolytic solution during discharge of the battery, wherein the solubility of the copper material in the electrolytic solution is reduced. The negative electrode can include an aluminum material.

The battery can be a primary battery or a secondary battery. Primary batteries are meant to be discharged, e.g., to exhaustion, only once, and then discarded. Primary batteries are not intended to be recharged. Secondary batteries can be recharged for many times, e.g., more than fifty times, more than a hundred times, or more. In some cases, secondary batteries can include relatively robust separators, such as those having many layers and/or that are relatively thick. Secondary batteries can also be designed to accommodate for changes, such as swelling, that can occur in the batteries. Secondary batteries are described, e.g., in Falk & Salkind, "Alkaline Storage Batteries", John Wiley & Sons, Inc. 1969; U.S. Pat. No. 345,124; and French Patent No. 164,681, all hereby incorporated by reference.

Other aspects, features, and advantages of the invention will be apparent from the drawing, description, and claims.

DESCRIPTION OF THE DRAWING

The FIGURE is a cross-sectional view of a battery.

DETAILED DESCRIPTION OF THE PREFERRED EMBODIMENTS

Referring to the FIGURE, a battery or electrochemical cell 10 includes a cylindrical housing 18 containing a positive electrode 12, a negative electrode 14, and a separator 16 between the electrodes. Positive electrode 12 includes an active copper material, such as copper oxide, and negative electrode 14 includes an active zinc material. Battery 10 also includes a current collector 20, a seal 22, and a metal top cap 24, which serve as the negative terminal for the battery. Positive electrode 12 is in contact with housing 18, and the positive terminal of battery 10 is at the end of the battery opposite from the negative terminal. An electrolytic solution is dispersed throughout battery 10.

The electrolytic solution or electrolyte can be any of the electrolytic solutions used in batteries. The electrolytic solution can be an alkaline solution, such as an aqueous hydroxide solution, e.g., LiOH, NaOH, KOH, or mixtures of hydroxide solutions (e.g., NaOH/KOH). For example, the aqueous hydroxide solution can include between about 33 and about 40 by weight percent of the hydroxide material, such as about 9 N KOH (about 37 weight percent KOH). In some embodiments, the electrolyte can also include up to about 6 weight percent of zinc oxide, e.g., about 2 by weight percent zinc oxide.

Relatively concentrated alkaline electrolytic solutions can dissolve the active copper material present in a positive electrode. In some situations, the dissolved copper material can diffuse to the zinc negative electrode and form copper metal while consuming a corresponding amount of zinc: $Zn+Cu(OH)_4^{2-} \rightarrow Zn(OH)_4^{2-}+Cu$. As a result, both the active material of the positive electrode and the active material of the negative electrode are consumed, and the capacity of the battery can be lowered. In some cases, the formed copper metal can cause evolution of hydrogen at negative electrode 14, thereby increasing the pressure within the battery and potentially causing the battery to vent. Furthermore, the formed copper metal can deposit as dendrites that extend from the negative electrode toward the positive electrode. The dendrites can penetrate the separator and contact the positive electrode, thereby short circuiting the battery. Consequently, the storage life of the battery can be short and/or unreliable, particularly at elevated temperatures, which can accelerate formation of copper metal.

In some embodiments, the electrolytic solution of battery 10 includes a soluble material that reduces (e.g., suppresses) the solubility of the active material of the positive electrode in the electrolytic solution. Suitable materials include one or more aluminum materials that can dissolve in the electrolytic solution. Without wishing to be bound by theory, it is believed that the soluble aluminum material(s) may be forming a compound, such as a copper-aluminum compound, that is insoluble in the electrolytic solution. The aluminum material(s) may also be reacting with the electrolytic solution and lowering the solubilizing power of the electrolytic solution. Examples of suitable aluminum materials include commercially available powders of aluminum metal, aluminum oxide (e.g., $Al_2O_3$), aluminum hydroxide ($Al(OH)_3$), alkali metal aluminum oxides (e.g., $NaAlO_2$), metal aluminum oxides (e.g., copper aluminum oxides such as $CuAl_2O_4$), and other materials containing aluminum. Mixtures of aluminum materials can be used. The electrolytic solution can be saturated with the aluminum material(s) or be less than saturated. The electrolytic solution can include between about one and about eight weight percent of aluminum. For example, the electrolytic solution can include equal to or greater than about one, two, three, four, five, six, or seven weight percent of aluminum; and/or equal to or less than about eight, seven, six, five, four, three, or two weight percent of aluminum. For a relatively unconcentrated alkaline electrolytic solution, less aluminum material can be used because the solubility of the copper material in the electrolytic solution is lowered.

Positive electrode 12 includes an active material having the copper material, a conductive aid, and a binder.

The copper material can be copper oxide, such as cupric oxide (CuO) or cuprous oxide ($Cu_2O$). The oxides can be stoichiometric (e.g., CuO) or non-stoichiometric (e.g., $CuO_x$, where $0.5 \leq x \leq 1.5$). In some embodiments, positive electrode 12 includes between about 86% and about 92%, preferably between about 88% and about 91%, and more preferably between about 89% and about 91%, of copper oxide by weight. All weight percentages provided herein are determined after the electrolytic solution has been dispersed. Other suitable copper materials include copper chloride (e.g., $CuCl_2$), copper permanganate (e.g., $Cu(MnO_4)_2$), or other copper-containing active materials. The copper material in positive electrode 12 can include only copper oxide, or a mixture of copper materials. For example, of the copper material in positive electrode 12, the positive electrode can include 5–100% by weight of copper chloride(s) and/or copper permanganate(s), with the remainder being, e.g., cupric oxide.

The conductive aid can increase the electronic conductivity of positive electrode 12. An example of a conductive aid is graphite particles. The graphite particles can be any of the graphite particles used in positive electrodes. The particles can be synthetic or nonsynthetic, and they can be expanded or nonexpanded. In certain embodiments, the graphite particles are nonsynthetic, nonexpanded graphite particles. In these embodiments, the graphite particles can have an average particle size of less than about 20 microns, for example, from about 2 microns to about 12 microns, or from about 5 microns to about 9 microns as measured using a Syrnpatec HELIOS analyzer. Nonsynthetic, nonexpanded graphite particles can be obtained from, for example, Brazilian Nacional de Grafite (Itapecirica, MG Brazil (MP-0702x). Alternatively or in addition, the conductive aid can include carbon fibers, described in commonly assigned U.S. Ser. No. 09/658,042, filed Sep. 7, 2000; and U.S. Ser. No. 09/829,709, filed Apr. 10, 2001. In some embodiments, positive electrode 12 includes between about 1% and about 10% by weight of one or more conductive aids.

Examples of binders include polyethylene powders, polyacrylamides, Portland cement and fluorocarbon resins, such as polyvinylidenefluoride (PVDF) and polytetrafluoroethylene (PTFE). An example of a polyethylene binder is sold under the tradename Coathylene HA-1681 (available from Hoechst). Positive electrode 12 may include, for example, between 0.1 percent to about 1 percent of binder by weight.

Positive electrode 12 can include other additives. Examples of these additives are disclosed, for example, in U.S. Pat. No. 5,342,712, which is hereby incorporated by reference. Positive electrode 12 may include, for example, from about 0.2 weight percent to about 2 percent $TiO_2$ by weight. A surfactant, such as, e.g., polyvinyl alcohol (PVA), ethylene-vinyl alcohol (EVOH), and polyvinylbutyrol may be added.

Negative electrode 14 can be formed of any of the zinc materials used in battery negative electrodes. For example, negative electrode 14 can be a zinc gel that includes zinc metal particles, a gelling agent, and minor amounts of additives, such as gassing inhibitor. In addition, a portion of the electrolytic solution is dispersed throughout the negative electrode.

The zinc particles can be any of the zinc particles used in gel negative electrodes. Examples of zinc particles include those described in U.S. Ser. No. 08/905,254, U.S. Ser. No. 09/115,867, and U.S. Ser. No. 09/156,915, which are assigned to the assignee in the present application and are hereby incorporated by reference. The zinc particles can be a zinc alloy, e.g., containing a few hundred parts per million of indium and bismuth. Negative electrode 14 may include, for example, between 67% and 71% of zinc particles by weight.

Examples of gelling agents include polyacrylic acids, grafted starch materials, salts of polyacrylic acids, polyacrylates, carboxymethylcellulose or combinations thereof. Examples of such polyacrylic acids are Carbopol 940 and 934 (available from B.F. Goodrich) and Polygel 4P (available from 3V), and an example of a grafted starch material is Waterlock A221 (available from Grain Processing Corporation, Muscatine, Iowa). An example of a salt of a polyacrylic acid is Alcosorb G1 (available from Ciba Specialties). Negative electrode 14 may include, for example, from 0.1 percent to about 1 percent gelling agent by weight.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Negative electrode 14 can include other materials. For example, in other embodiments, negative electrode 14 can include metals capable of reducing a positive electrode containing a copper material. Suitable metals include, for example, aluminum, magnesium, calcium, silicon, boron, titanium, zirconium, hafnium, lanthanum, manganese, iron, cobalt, chromium, tantalum, or niobium. Binary, ternary, quaternary and other multi-component alloy combinations of these metals, and also those combinations including zinc with these metals, can be used.

Separator 16 can have any of the designs for battery separators. In some embodiments, separator 16 can be formed of two layers of non-woven, non-membrane material with one layer being disposed along a surface of the other. To reduce (e.g., minimize) the volume of separator 16 while providing an efficient battery, each layer of non-woven, non-membrane material can have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. The layers can be substantially devoid of fillers, such as inorganic particles.

In other embodiments, separator 16 includes an outer layer of cellophane with a layer of non-woven material. The separator also includes an additional layer of non-woven material. The cellophane layer can be adjacent positive electrode 12 or negative electrode 14. Preferably, the non-woven material contains from about 78 weight percent to about 82 weight percent PVA and from about 18 weight percent to about 22 weight percent rayon with a trace of surfactant. Such non-woven materials are available from PDM under the tradename PA25. Other examples of separators include fibrous absorbent materials or fabric separators described in U.S. Pat. Nos. 143,644; 274,110; 542,049; 1,017,064; 1,207,382; 1,255,283; 1,282,057; 1,295,459; 1,316,761; 1,386,095; 1,415,860; 1,532,252; 1,564,741; 1,624,460; and 2,157,072.

Housing 18 can be any housing commonly used in batteries, e.g., primary alkaline batteries. In some embodiments, housing 18 includes an inner metal wall and an outer electrically non-conductive material such as heat shrinkable plastic. Optionally, a layer of conductive material can be disposed between the inner wall and positive electrode 12. The layer may be disposed along the inner surface of wall, along the circumference of positive electrode 12 or both. This conductive layer can be formed, for example, of a carbonaceous material. Such materials include LB1000 (Timcal), Eccocoat 257 (W.R. Grace & Co.), Electrodag 109 (Acheson Colloids Co.), Electrodag 112 (Acheson) and EB0005 (Acheson). Methods of applying the conductive layer are disclosed in, for example, Canadian Patent No. 1,263,697, which is hereby incorporated by reference.

Current collector 20 can be made from a suitable metal, such as brass. Seal 22 can be made, for example, of nylon.

Battery 10 can be assembled using conventional methods. In some embodiments, positive electrode 12 can be formed by a pack and drill method, described in U.S. Ser. No. 09/645,632, filed Aug. 24, 2000.

Numerous other embodiments are possible. For example, the copper material in positive electrode 12 can be a minor component of the positive electrode. For example, positive electrode 12 can include mostly other transition metal materials, such as manganese oxide, nickel oxide, or cobalt oxide. The copper material can be an additive to, e.g., to increase capacity. An example of a manganese oxide-based battery is described in U.S. Pat. No. 6,440,181. Including the electrolyte as described above can reduce the solubility of the copper material in the battery.

In other embodiments, the material that reduces the solubility of the active material of the positive electrode in the electrolytic solution can be introduced into the electrolytic solution during use. For example, a cell can include an aluminum-containing negative electrode. One or more aluminum materials can be incorporated into the electrolytic solution as the cell is discharged, and the electrode dissolves. The negative electrode can include, for example, aluminum metal or an aluminum alloy, such as Al—Mg, Al—Ti, or Al—Zr.

In some cases, battery 10 can include a hydrogen recombination catalyst to reduce in the cell the amount of hydrogen gas, which can be generated when copper metal is plated and zinc is oxidized. Suitable hydrogen recombination catalysts are described, e.g., in U.S. Pat. Nos. 6,500,576, and 3,893,870. Alternatively or in addition, battery 10 can be constructed to include pressure-activated valves or vents, as described, e.g., in U.S. Pat. No. 5,300,371.

Battery 10 can be, for example, a AA, AAA, AAAA, C, or D battery. In other embodiments, battery 10 can be non-cylindrical, such as coin cell, button cells, prismatic cells, or racetrack shaped cells. Battery 10 can include a multi-lobed electrode, as described in U.S. Ser. No. 09/358,578, filed Sep. 21, 1999.

All references, such as patent applications, publications, and patents, referred to herein are incorporated by reference in their entirety.

Other embodiments are in the claims.

What is claimed is:

1. A battery, comprising:
   a housing;
   a positive electrode in the housing, the positive electrode comprising a copper material;
   a negative electrode in the housing;
   a separator between the positive electrode and the negative electrode; and
   an aqueous electrolytic solution in the housing, the aqueous electrolytic solution comprising dissolved aluminum material,
   wherein the aqueous electrolytic solution comprises equal to or greater than about one weight percent of aluminum.

2. The battery of claim 1, wherein the copper material comprises copper oxide.

3. The battery of claim 1, wherein the copper material comprises cupric oxide.

4. The battery of claim 1, wherein the positive electrode comprises greater than about 86 weight percent of copper oxide.

5. The battery of claim 1, wherein the positive electrode further comprises a binder and a conductive aid.

6. The battery of claim 1, wherein the negative electrode comprises zinc.

7. The battery of claim 1, wherein the negative electrode comprises a material comprising an element selected from the group consisting of aluminum, magnesium, calcium, silicon, boron, titanium, zirconium, hafnium, lanthanum, manganese, iron, cobalt, chromium, tantalum, and niobium.

8. The battery of claim 1, wherein the aqueous electrolytic solution is alkaline.

9. The battery of claim 1, wherein the aqueous electrolytic solution comprises a material selected from the group consisting of potassium hydroxide and sodium hydroxide.

10. The battery of claim 1, wherein the aqueous electrolytic solution is saturated with soluble aluminum.

11. The battery of claim 1, wherein the aqueous electrolytic solution comprises equal to or less than about eight percent by weight of aluminum.

12. The battery of claim 1, wherein the battery is a primary battery.

13. The battery of claim 1, wherein the battery is a secondary battery.

14. A primary alkaline battery, comprising:
   a housing;
   a positive electrode in the housing, the positive electrode comprising greater than about one weight percent of copper oxide;
   a negative electrode in the housing, the negative electrode comprising zinc;
   a separator between the positive electrode and the negative electrode; and
   an aqueous alkaline electrolytic solution in the housing, the aqueous electrolytic solution comprising a hydroxide material and dissolved aluminum material,
   wherein the aqueous electrolytic solution comprises equal to or greater than about one weight percent of aluminum.

15. The battery of claim 14, wherein the aqueous electrolytic solution comprises between about one and about eight weight percent of aluminum.

16. The battery of claim 14, wherein the aqueous electrolytic solution comprises a material selected from the group consisting of potassium hydroxide and sodium hydroxide.

* * * * *